(12) United States Patent
Jau

(10) Patent No.: US 7,998,532 B2
(45) Date of Patent: Aug. 16, 2011

(54) METHOD FOR SELF-CURING CONCRETE

(76) Inventor: Wen-Chen Jau, Hsinchu (TW)

( * ) Notice: Subject to any disclaimer, the term of this patent is extended or adjusted under 35 U.S.C. 154(b) by 1121 days.

(21) Appl. No.: 11/802,242

(22) Filed: May 21, 2007

(65) Prior Publication Data
US 2010/0159145 A1    Jun. 24, 2010

(30) Foreign Application Priority Data

May 23, 2006   (CN) .......................... 2006 1 0080648

(51) Int. Cl.
*B05D 7/24*    (2006.01)
*B05D 1/36*    (2006.01)

(52) U.S. Cl. ...................... 427/403; 427/407.1; 427/333

(58) Field of Classification Search .................. 427/403, 427/407.1, 333
See application file for complete search history.

(56) References Cited

FOREIGN PATENT DOCUMENTS
SU             652154 A   *  3/1979
* cited by examiner

*Primary Examiner* — William Phillip Fletcher, III
(74) *Attorney, Agent, or Firm* — Muncy, Geissler, Olds, & Lowe, PLLC

(57) ABSTRACT

A method for self-curing concrete is provided to solve the problem that the degree of cement hydration is lowered due to the improper curing, and thus unsatisfactory properties of concrete. According to the invention, at least a layer of self-curing agent is applied onto a concrete after placing. The self-curing agent can absorb moisture from atmosphere and then release it into concrete. The concrete can be self-cured without the need for applying extra water or external curing.

20 Claims, 5 Drawing Sheets

METHOD FOR SELF-CURING CONCRETE

FIELD OF THE INVENTION

The present invention relates generally to method for curing concrete, and more particularly to a method for self-curing concrete.

BACKGROUND OF THE INVENTION

If no any curing measure is taken for concrete against natural setting or hardening, substantial water losses will occur due to fast water evaporation, thus prevents cement from hydration and leads to dusting or drying crack on concrete surface. In such case, the strength and durability of concrete will be reduced. After placing of concrete, curing shall be duly required to avoid water loss and drying crack. External curing is generally required for concrete after placing. In other words, water spraying or covering by plastic membrane or burlaps is applied to concrete surface to maintain enough moisture, namely, so-called "moist curing" is performed to ensure full cement hydration for a higher compressive strength. However, "moist curing" method needs regular maintenance such as manual watering, sprinkling or spraying, while repetitive wetting and drying will result in cracks against structural integrity.

In addition, available common methods for curing concrete include membrane curing and water-proof covering. According to membrane curing method, when liquid membrane-forming compounds for curing concrete (also referred to as membrane protective agent) is sprayed onto fresh concrete surface, the curing agent will rapidly form a water-proof film on the concrete surface, which prevents water evaporation and provides hydration conditions for cement. The curing agents, which are generally made of silica gel or latex film, can easily aggregate at depressed concrete surface, thus reducing the surface friction coefficient. Water-proof covering method applies only to large-sized simple structure. Despite of domestic and foreign regulations on "proper curing", the relevant research shows that, even the most fundamental curing requirements are not met, or totally ignored in practical engineering.

SUMMARY OF THE INVENTION

The major objective of the present invention is to provide a method for self-curing concrete. After placing of concrete, brushing or spraying method is employed to apply self-curing agent onto surface of concrete. The self-curing agent can absorb moisture from atmosphere and then release it into concrete, that concrete is self-cured without the need of external curing after placing. Thus, water evaporation after removal of formwork can be reduced, and the degree of cement hydration is improved without standard curing. Furthermore, compressive strength will be enhanced together with reduced shrinkage arising from water evaporation, making it ideal for concrete placing without any external curing.

Another objective of the present invention is to provide an alternative method for self-curing concrete. When the first self-curing agent has infiltrated into concrete for the first surface covering, the second surface covering is performed to ensure that the first and second self-curing agents are partially embedded into concrete. The second self-curing agent absorbs moisture from atmosphere and then transfers it to the first self-curing agent, which then releases the moisture into inner side of concrete for a continued wetting state.

According to the method for self-curing concrete of the present invention, when the first self-curing agent is applied onto concrete for the first-time surface covering after placing of concrete, the first self-curing agent can absorb moisture from atmosphere and then release it into concrete, such that the concrete can be self-curing without the need of any external curing. Alternatively, after the first self-curing agent has infiltrated into concrete, a second surface covering is performed such that the first and second self-curing agents are embedded into concrete to release moisture to inner side of concrete.

DETAIL DESCRIPTION OF THE INVENTION

The features and the advantages of the present invention will be more readily understood upon a thoughtful deliberation of the following detailed description of a preferred embodiment of the present invention with reference to the accompanying drawings.

To ensure a simple and efficient curing of concrete, a high-performance self-curing agent of the present invention, which features higher wettability and water absorbability, shall be applied onto the concrete for self-curing purpose. "Self-curing concrete" means that no labor work is required to provide water for concrete, or even no any other external curing is required after placing for self-curing purpose.

Figure 1:
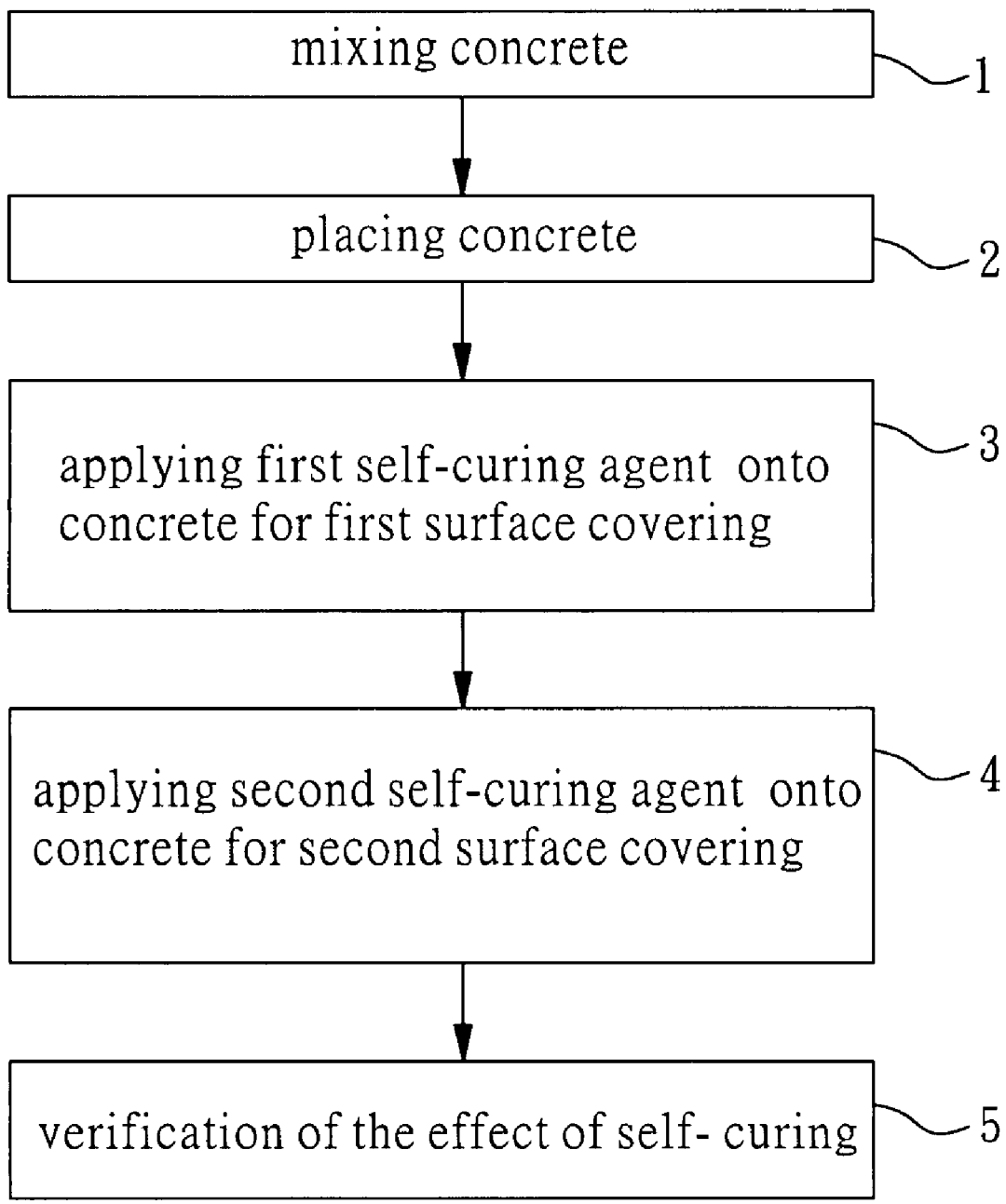
FIG. 1 shows the flow chart of self-curing concrete of the present invention.

Referring to FIG. 1, a work flow of self-curing method comprises: step 1: "mixing concrete"; step 2: "placing concrete"; step 3: "applying first self-curing agent onto concrete for first surface covering"; step 4: "applying second self-curing agent onto concrete for second surface covering" and step 5: "verification of the effect of self-curing".

Firstly, an optional concrete mixture ratio is selected for step 1, which contains coarse aggregates, fine aggregates, cement, pozzolans, superplasticizer and mixing water of proper mix proportion. In step 2, the mixed concrete is placed into formworks. After initial setting of concrete, perform step 3 to apply first self-curing agent onto concrete surface by means of uniform brushing or spraying. During the surface covering in step 3, the liquid state first self-curing agent can absorb moisture from atmosphere and then release it into concrete. The available self-curing agents may be one or combination of the following materials, namely polyatomic alcohol includes: polyethylene glycol (PEG), propylene glycol (PG), dipropylene glycol (DPG), butylene glycol, neopently glycol (NPG), xylitol, sorbitol, glycerine and phytosterols. Alternatively, the agents includes: hyaluronic acid, polyxyethylene (POE), sodium pyrrolidone carboxylate (PCA-Na), stearyl alcohol and cetyl alcohol. The required amount of first self-curing agent is approx. 10 to 500 gw/m$^2$, or practically about 150 gw/m$^2$.

To improve the self-curing effect of self-curing agent, after the first self-curing agent has infiltrated into concrete, perform step 4 for second-time surface covering after 5-10 minutes of step 3, such that the second self-curing agent is applied to the surface of the first self-curing agent. The first and second self-curing agent may be made of the same or different materials, but the second self-curing agent shall be able to absorb moisture from atmosphere and release to the first self-curing agent, making it possible for moisture to infiltrate into concrete.

The present invention employs self-curing agent made of polyethylene glycol to absorb moisture from atmosphere, thus helping self-curing of various concretes after surface covering, such as ordinary Portland concrete (OPC), self-consolidating concrete (SCC), high-performance concrete (HPC), lightweight concrete or mass concrete. After performing a test in an environment of RH 85%, where self-curing method of the present invention is applied to OPC of a water to cement ratio 0.6, it's found that the water loss in weight of OPC with self-curing effect has reduced by 32% as compared to OPC without curing, and the compressive strength has increased by 15%. If applying self-curing method of the present invention to SCC of a water to binder ratio 0.37 (water to cement ratio was 0.6), it's found that, after at least one surface covering by self-curing agent, the water loss in weight of SCC with self-curing agent was reduced by 46% as compared to SCC without curing, and the compressive strength has increased by 30%. Therefore, the present invention features simple operation and satisfactory curing of various concretes without any external curing work. In addition, the following test results show that the self-curing method of the present invention has an improved curing effect, a higher compressive strength and lower volume shrinkage.

The present invention can reduce water evaporation and improve curing effect after removal of formworks, as illustrated in the following test:

In the following tables, RH represents air humidity, and common membrane is commercially available liquid membrane-forming compounds for curing concrete conforming to ASTM C309. The self-curing agent of the present invention is polyethylene glycol (PEG) in the first preferred embodiment, and propylene glycol in the second preferred embodiment. In above-specified work flow, the self-curing agent applied to OPC and SCC (50 gw/m$^2$, 100 gw/m$^2$, 150 gw/m$^2$) is represented by "small quantity", "moderate quantity" and "large quantity".

TABLE 1

Water Loss for OPC Curing (RH = 67.5%)

| W/C = 0.6 | Water Loss (unit: gw) | | | | Weight Loss Ratio |
|---|---|---|---|---|---|
| | 1 day | 2 days | 4 days | 7 days | |
| No curing | 0 | 78.2 | 98.8 | 114.3 | 1 |
| The first embodiment-small quantity | 0 | 65.5 | 94.6 | 106 | 0.927 |
| The first embodiment-moderate quantity | 0 | 47.3 | 80.3 | 100.1 | 0.876 |
| The first embodiment-large quantity | 0 | 30.2 | 63.5 | 84.5 | 0.739 |
| The second embodiment-small quantity | 0 | 69.1 | 65.4 | 112.6 | 0.985 |
| The second embodiment-moderate quantity | 0 | 52.8 | 90 | 109.8 | 0.960 |
| The second embodiment-large quantity | 0 | 50.9 | 87.4 | 105.7 | 0.925 |

TABLE 2

Water Loss for OPC Curing (RH = 85%)

| W/C = 0.6 | Water Loss (unit: gw) | | | | Weight Loss Ratio |
|---|---|---|---|---|---|
| | 1 day | 2 days | 4 days | 7 days | |
| No curing | 0 | 62.7 | 98.7 | 112.2 | 1 |
| Membrane | 0 | 56 | 93.3 | 107.6 | 0.958 |
| The first embodiment-small quantity | 0 | 50.2 | 85.8 | 100.2 | 0.893 |
| The first embodiment-moderate quantity | 0 | 44.2 | 74.6 | 89.2 | 0.795 |
| The first embodiment-large quantity | 0 | 32.2 | 61.3 | 76.8 | 0.684 |

TABLE 3

Water Loss for SCC Curing (RH = 67.5%)

| W/C = 0.6, W/B = 0.37 | Water Loss (unit: gw) | | | | Weight Loss Ratio |
|---|---|---|---|---|---|
| | 1 day | 2 days | 4 days | 7 days | |
| No curing | 0 | 65.1 | 83.1 | 97.3 | 1 |
| The first embodiment-small quantity | 0 | 58.6 | 74.9 | 88 | 0.904 |
| The first embodiment-moderate quantity | 0 | 50.2 | 67.2 | 79.1 | 0.812 |
| The first embodiment-large quantity | 0 | 35.5 | 52.5 | 69.1 | 0.710 |
| The second embodiment-small quantity | 0 | 51.7 | 72.3 | 85 | 0.873 |
| The second embodiment-moderate quantity | 0 | 42.5 | 63.6 | 77.2 | 0.793 |
| The second embodiment-large quantity | 0 | 38.8 | 60.0 | 74.0 | 0.761 |

TABLE 4

Water Loss for SCC Curing (RH = 85%)

| W/C = 0.6, W/B = 0.37 | Water Loss (unit: gw) | | | | Weight Loss Ratio |
|---|---|---|---|---|---|
| | 1 day | 2 days | 4 days | 7 days | |
| No curing | 0 | 63.2 | 79.6 | 86.0 | 1 |
| membrane | 0 | 57.9 | 75.6 | 80.9 | 0.940 |
| The first embodiment-small quantity | 0 | 41.6 | 60 | 69.5 | 0.807 |
| The first embodiment-moderate quantity | 0 | 30.1 | 49.0 | 57.7 | 0.671 |
| The first embodiment-large quantity | 0 | 17.3 | 37.9 | 46.4 | 0.539 |

Therefore, the self-curing method of the present invention is optimally suited for OPC and SCC, demonstrated by its lower water loss than OPC and SCC without curing or with membrane. The self-curing agent of the present invention can absorb moisture from atmosphere and then release it into concrete. Commonly used commercially available membrane usually can only partially prevent water loss from concrete to atmosphere.

Figure 2A:
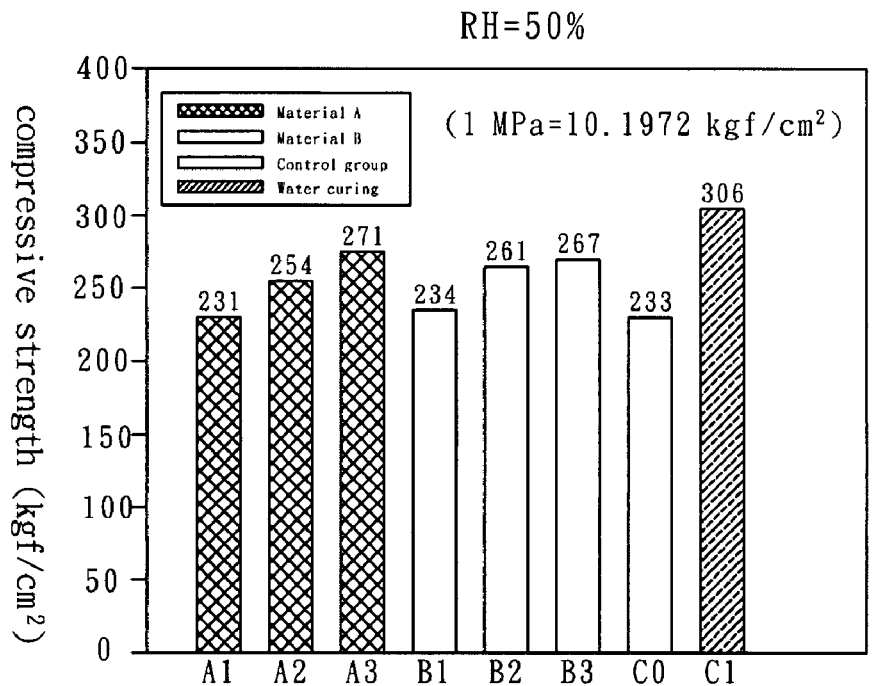
FIGS. 2A to 2C show the comparison diagram of curing methods for OPC under different RH conditions.
Figure 2B:
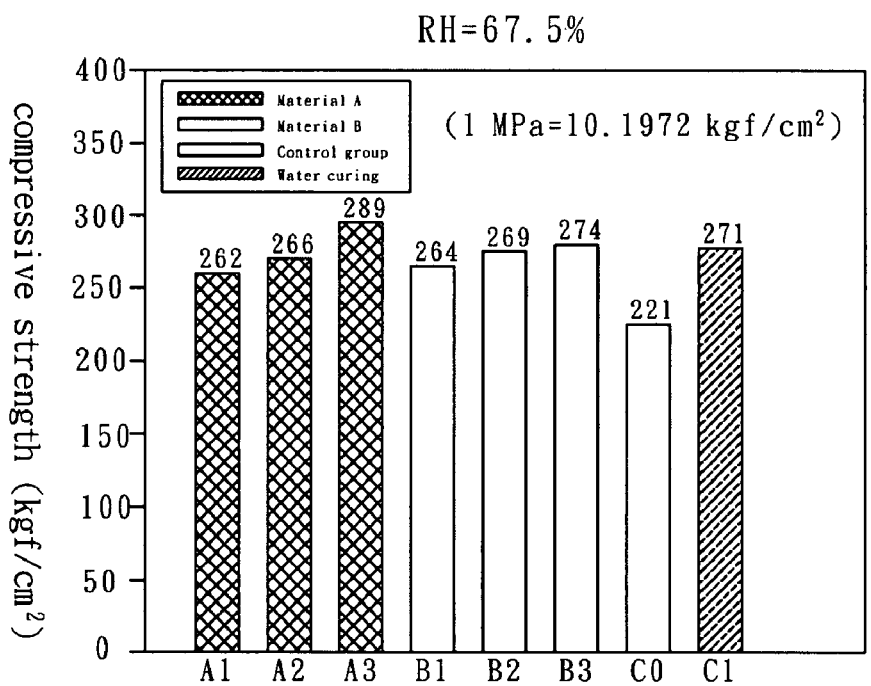
Figure 2C:
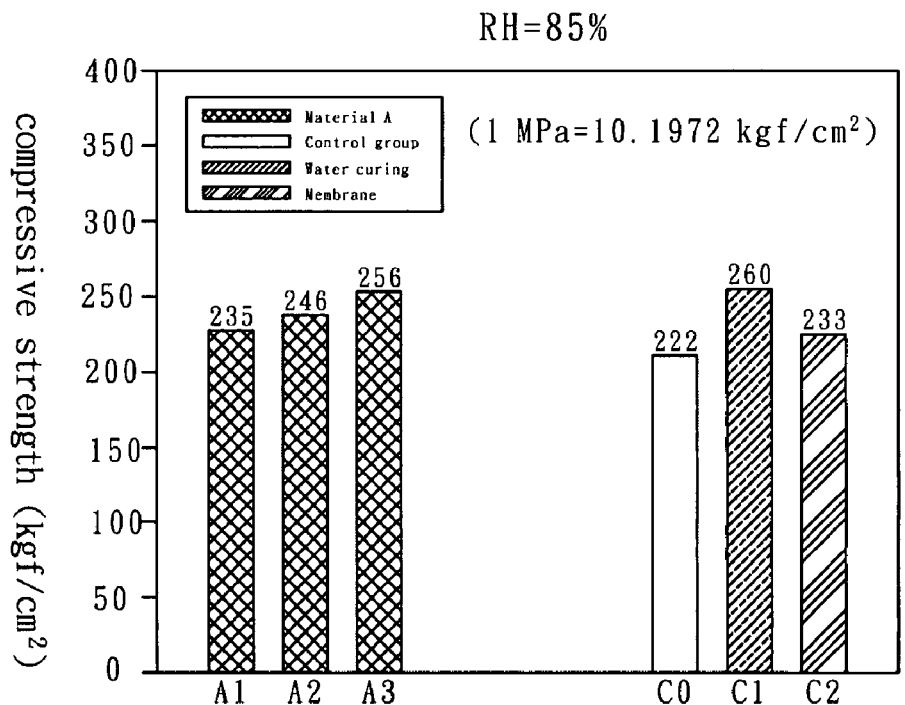

The improved compressive strength of the present invention is described with the following tests and diagrams:

Referring to FIGS. 2A to 2C, OPCs are used for curing in different conditions, and then the compressive strengths are compared. As illustrated in FIG. 2A, the compressive strength of first preferred embodiment (polyethylene glycol) in the environment of RH 50% is 231, 254, 271 kgf/cm² respectively, according to the classification of "small quantity", "moderate quantity" and "large quantity" (A1, A2, A3); the compressive strength of second preferred embodiment (propylene glycol) is 230, 237, 247 kgf/cm² respectively. Conversely, the compressive strength of common concrete without curing (C0) is 233 kgf/cm² (1 MPa=10.1972 kgf/cm²), and that with moist curing (C1) is 306 kgf/cm². The compressive strength of self-curing method of the present invention (A1, A2, A3, B1, B2, B3) is higher than that without curing (C0), but lower than that with moist curing (C1). Referring to FIGS. 2B and 2C, in the environment of RH 67.5% and 85%, the compressive strength of self-curing method of the present invention (A1, A2, A3, B1, B2, B3) is higher than that without curing (C0), and close to or equal to that with standard moist curing (C1) and commonly used method of membrane (C2). The self-curing method of the present invention can improve the compressive strength of OPC in the case of RH higher than 67.5%.

Figure 3A:
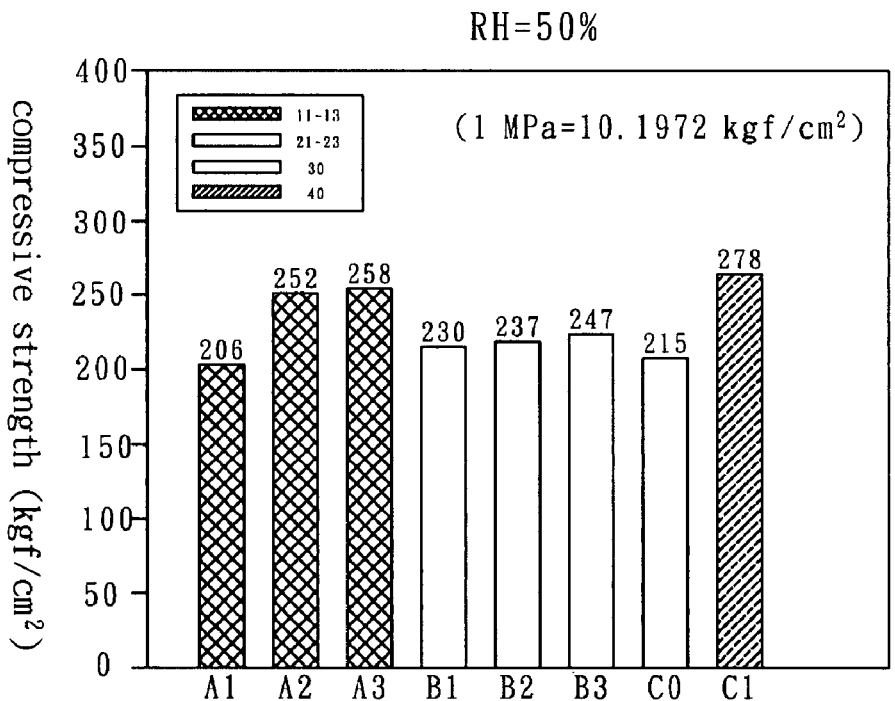
FIGS. 3A to 3C show the comparison diagram of curing methods for SCC under different RH conditions.
Figure 3B:
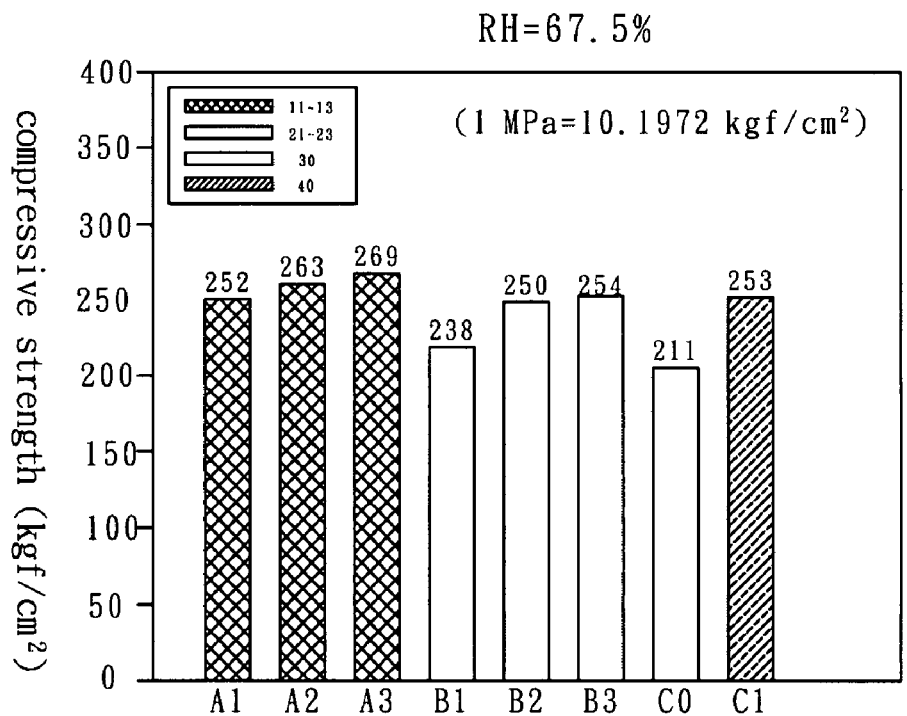
Figure 3C:
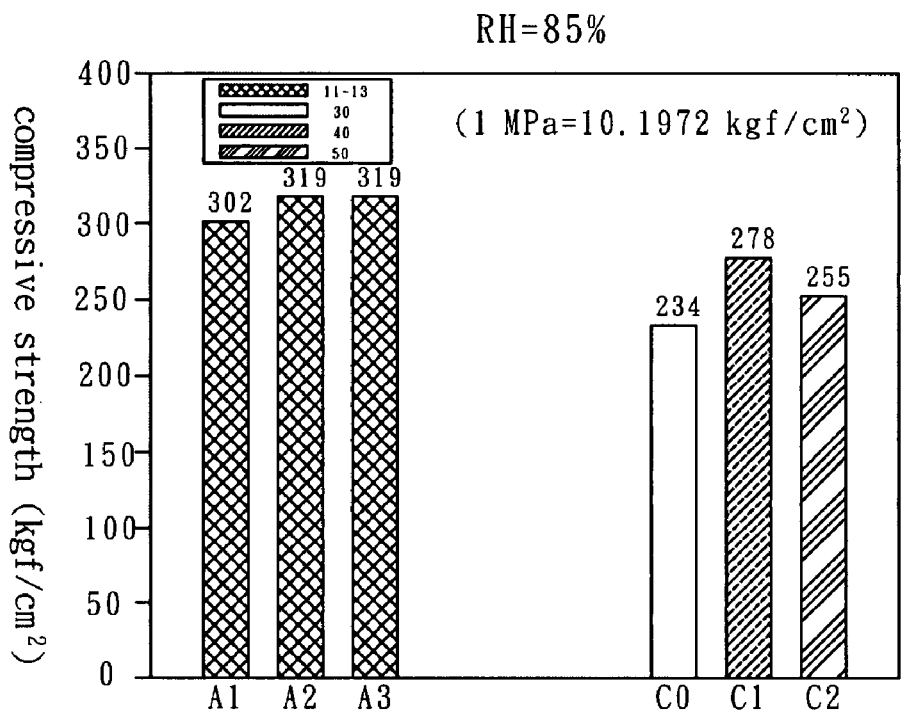

Referring also to FIGS. 3A to 3C, SCCs are used for curing in different conditions, and then the compressive strengths are compared. As illustrated in FIG. 3A, the compressive strength of first and second preferred embodiments (polyethylene glycol) (A1, A2, A3, B1, B2, B3) in the environment of RH 50% is slightly higher than that without curing (C0), and lower than that with moist curing (C1), according to the classification of "small quantity", "moderate quantity" and "large quantity". Referring to FIG. 3B, in the environment of RH 67.5%, the compressive strength of self-curing method of the present invention (A1, A2, A3, B1, B2, B3) is much higher than that without curing (C0), and higher than or equal to that with moist curing (C1). Referring also to FIG. 3C, the compressive strength of self-curing method (A1, A2, A3) in the environment of RH 85% is 302, 319, 319 kgf/cm² (1 MPa=10.1972 kgf/cm²), respectively, much higher than that of no curing (C0) (234 kgf/cm²), with moist curing (C1) (278 kgf/cm²) and of common membrane curing (C2) (255 kgf/cm²). It's thus proved that, the self-curing method of the present invention can improve the compressive strength of SCC in the case of RH higher than 50%, especially at 85%.

Figure 4:
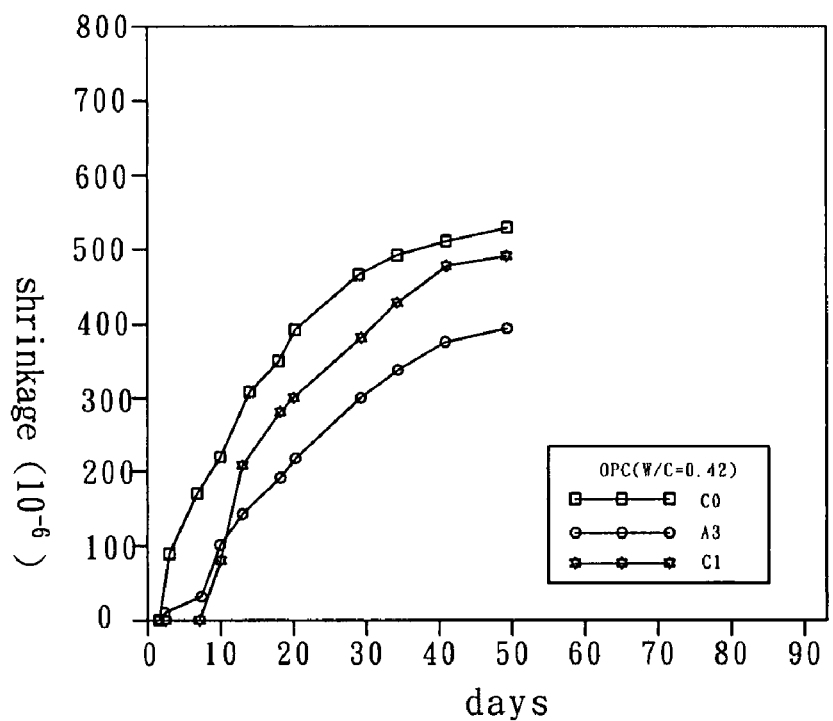
FIG. 4 shows the comparison diagram of shrinkage and duration of OPC under different RH conditions.

The present invention can reduce shrinkage arising from water evaporation as described with the following tests and diagrams:

FIG. 4 depicts the comparative shrinkage with time after placing of OPC without (C0), or with moist curing (C1) and self-curing method (A3) of the first preferred embodiment (large quantity polyethylene glycol). The self-curing method (A3) of the first preferred embodiment (large quantity polyethylene glycol) can keep the shrinkage of OPC lower than that without curing (C0). After a period of about 10 days, the self-curing method (A3) of the first preferred embodiment (large quantity polyethylene glycol) can also keep the shrinkage of OPC lower than that of common moist curing (C1), thus proving a better effect of reducing concrete shrinkage arising from water evaporation.

Figure 5:
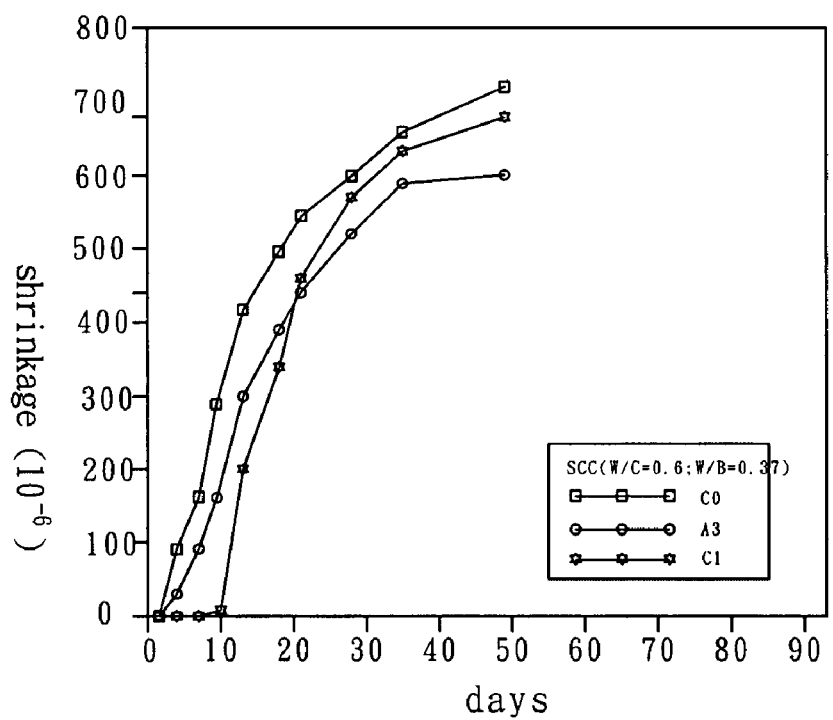
FIG. 5 shows the comparison diagram of shrinkage and duration of SCC under different RH conditions.

FIG. 5 depicts the comparative shrinkage with time of SCC without (C0), or with moist curing (C1) and self-curing method (A3) of the first preferred embodiment (large quantity polyethylene glycol). The self-curing method (A3) of the first preferred embodiment (large quantity polyethylene glycol) can keep the shrinkage of SCC lower than that without curing (C0). After a period of about 20 days, the self-curing method (A3) of the first preferred embodiment (large quantity polyethylene glycol) can also keep the shrinkage of SCC lower than that of common moist curing (C1), thus proving a better effect of reducing concrete shrinkage arising from water evaporation.

Therefore, the self-curing method of the present invention ensures a satisfactory self-curing without any standard curing after placing. Additionally, it can reduce water evaporation after removal of concrete formworks and concrete shrinkage arising from water evaporation while improving compressive strength.

Although the invention has been explained in relation to its preferred embodiment, it is to be understood that many other possible modifications and variations can be made without departing from the spirit and scope of the invention as hereinafter claimed.

What is claimed is:

1. A method for self-curing concrete, comprising a step of placing concrete, and then a step of the first surface-covering to apply a layer of self-curing agent in liquid state onto the concrete, wherein the first self-curing agent absorbs moisture from atmosphere and then releases it into concrete, thereby achieving self-curing without water curing, the method further comprising a step of a second surface-covering to apply a second layer of self-curing agent in liquid state over the first self-curing agent after the first self-curing agent is firstly infiltrated into the concrete, wherein the first and the second self-curing agents are made of different materials.

2. The method as claimed in claim 1 wherein the time interval between the first and the second surface-covering steps is about 5 to 10 minutes.

3. The method as claimed in claim 1, wherein the amount of the first self-curing agent is over 10 gw/m² in solid.

4. The method as claimed in claim 1, wherein the material of the first self-curing agent contains polyatomic alcohol.

5. The method as claimed in claim 4, wherein the polyatomic alcohol is selected from the group consisting of polyethylene glycol (PEG), propylene glycol (PG), dipropylene glycol (DPG), butylene glycol, neopently glycol (NPG), xylitol, sorbitol, glycerine and phytosterols.

6. The method as claimed in claim 1, wherein the first self-curing agent is made of a material selected from the group consisting of hyaluronic acid, polyxyethylene (POE), and stearyl alcohol.

7. The method as claimed in claim 1, wherein the first surface-covering step is performed by means of brushing or spraying.

8. The method as claimed in claim 1, wherein the concrete is a self-consolidating concrete (SCC).

9. The method as claimed in claim 1, wherein the concrete is self-cured under RH (Relative Humidity) over 50%.

10. The method as claimed in claim 1, wherein the concrete is self-cured under RH over 67.5%.

11. The method as claimed in claim 1, wherein the concrete is self-cured under RH over 85%.

12. The method as claimed in claim 1, wherein the first self-curing agent is embedded into the concrete.

13. The method as claimed in claim 1, wherein the material of the first self-curing agent is made of sodium pyrrolidone carboxylate (PCA-Na).

14. A method for self-curing concrete, comprising the step of placing concrete, and then a step of a first surface-covering to apply a layer of self-curing agent in liquid state onto the concrete, wherein the first self-curing agent absorbs moisture from the atmosphere and then releases it into the concrete, thereby achieving self-curing without water curing, wherein the material of the first self-curing agent contains a polyatomic alcohol selected from the group consisting of polyethylene glycol (PEG), propylene glycol (PG), dipropylene glycol (DPG), butylene glycol, neopentyl glycol (NPG), xylitol, sorbitol, glycerine and phytosterols.

15. A method for self-curing concrete, comprising a step of placing concrete, and then a step of a first surface-covering to apply a layer of self-curing agent in liquid state onto the concrete, wherein the first self-curing agent absorbs moisture from atmosphere and then releases it into concrete, thereby achieving self-curing without water curing, wherein the concrete is a self-consolidating concrete (SCC).

16. The method as claimed in claim 15, wherein the material of the first self-curing agent contains polyatomic alcohol.

17. The method as claimed in claim 16, wherein the polyatomic alcohol is selected from the group consisting of polyethylene glycol (PEG), propylene glycol (PG), dipropylene glycol (DPG), butylene glycol, neopently glycol (NPG), xylitol, sorbitol, glycerine and phytosterols.

18. The method as claimed in claim 15, wherein the first self-curing agent is made of a material selected from the group consisting of hyaluronic acid, polyxyethylene (POE), and stearyl alcohol.

19. The method as claimed in claim 15, wherein the material of the first self-curing agent is made of sodium pyrrolidone carboxylate (PCA-Na).

20. A method for self-curing concrete, comprising a step of placing concrete, and then a step of a first surface-covering to apply a layer of self-curing agent in liquid state onto the concrete, wherein the first self-curing agent absorbs moisture from atmosphere and then releases it into concrete, thereby achieving self-curing without water curing, wherein the material of the first self-curing agent is made of sodium pyrrolidone carboxylate (PCA-Na).

* * * * *